(12) United States Patent
Staiger et al.

(10) Patent No.: US 11,137,320 B2
(45) Date of Patent: Oct. 5, 2021

(54) METHOD FOR PRODUCING A PRESSURE SENSOR MEASURING ELEMENT AND THUS OBTAINED PRESSURE SENSOR MEASURING ELEMENT

(71) Applicant: Trafag AG, Bubikon (CH)

(72) Inventors: Ulrich Staiger, Stein am Rhein (CH); Daniel Stark, Wagen (CH); Pahlke Achim, Schwerzenbach (CH); Dieter Zeisel, Forch (CH)

(73) Assignee: Trafag AG, Bubikon (CH)

( * ) Notice: Subject to any disclaimer, the term of this patent is extended or adjusted under 35 U.S.C. 154(b) by 163 days.

(21) Appl. No.: 16/469,914

(22) PCT Filed: Dec. 7, 2017

(86) PCT No.: PCT/EP2017/081912
§ 371 (c)(1),
(2) Date: Jun. 14, 2019

(87) PCT Pub. No.: WO2018/108710
PCT Pub. Date: Jun. 21, 2018

(65) Prior Publication Data
US 2019/0360894 A1 Nov. 28, 2019

(30) Foreign Application Priority Data
Dec. 14, 2016 (DE) ...................... 10 2016 124 410.4

(51) Int. Cl.
*G01L 1/00* (2006.01)
*G01L 1/22* (2006.01)
(Continued)

(52) U.S. Cl.
CPC .............. *G01M 15/08* (2013.01); *B22F 10/20* (2021.01); *B33Y 80/00* (2014.12); *F02B 77/085* (2013.01);
(Continued)

(58) Field of Classification Search
CPC ... G01L 1/00; G01L 1/16–22; G01L 9/00–08; G01L 9/0044; G01L 9/0055;
(Continued)

(56) References Cited

U.S. PATENT DOCUMENTS

2010/0002745 A1* 1/2010 Stoll ...................... G01D 21/02
374/143
2016/0103031 A1 4/2016 Tham
(Continued)

FOREIGN PATENT DOCUMENTS

CN 104907568 A 9/2015
DE 102005060652 A1 6/2007
(Continued)

OTHER PUBLICATIONS

Lucklum, F. et al., "3D Printed Pressure Sensor with Screen-Printed Resistive Read-Out", Institute for Microsensors, -acuators, and -systems (IMSAS), Microsystems Center Bremen (MCB), University of Bremen, D-28359, Bremen, Germany, IEEE, 3 pages (Oct. 30, 2016).

(Continued)

*Primary Examiner* — Nguyen Q. Ha
(74) *Attorney, Agent, or Firm* — Nelson Mullins Riley & Scarborough LLP; Kongsik Kim, Esq.

(57) ABSTRACT

The aim of the invention is to economically produce a pressure measuring sensor element, and relates, according to one aspect, to a method for producing a pressure sensor measuring element for a pressure sensor which comprises at least one membrane and a covering protecting the membrane, the pressure sensor element being produced in a layer-by-layer generative production method. This makes it possible to, for example, easily construct a combination sensor for detecting pressure and an additional parameter. It is also possible to structures for reinforcement or for influ- (Continued)

encing resonant frequency or for influencing heat conduction.

14 Claims, 7 Drawing Sheets

(51) Int. Cl.
*G01L 9/00* (2006.01)
*G01L 19/00* (2006.01)
*G01M 15/08* (2006.01)
*B33Y 80/00* (2015.01)
*F02B 77/08* (2006.01)
*G01L 19/06* (2006.01)
*B22F 10/20* (2021.01)
*B33Y 70/00* (2020.01)

(52) U.S. Cl.
CPC .......... *G01L 9/0044* (2013.01); *G01L 9/0055* (2013.01); *G01L 19/0092* (2013.01); *G01L 19/0645* (2013.01); *G01L 19/0681* (2013.01); *B22F 2301/35* (2013.01); *B33Y 70/00* (2014.12)

(58) Field of Classification Search
CPC . G01L 19/00; G01L 19/0092; G01L 19/0645; G01L 19/681; G01L 19/14; G01M 15/08; B22F 10/20; B22F 2301/35; B33Y 70/00; B33Y 80/00; F02B 77/085
See application file for complete search history.

(56) References Cited

U.S. PATENT DOCUMENTS

| | | | |
|---|---|---|---|
| 2016/0109316 A1 | 4/2016 | Chiang et al. | |
| 2016/0202101 A1* | 7/2016 | Sparks | C21D 1/26 |
| | | | 73/861.355 |
| 2018/0154484 A1* | 6/2018 | Hall | B33Y 50/02 |
| 2020/0232862 A1* | 7/2020 | Baumgartner | G01L 9/008 |

FOREIGN PATENT DOCUMENTS

| | | | | |
|---|---|---|---|---|
| WO | 2010-149501 A1 | 12/2010 | | |
| WO | WO-2010149501 A1 * | 12/2010 | ......... | G01L 19/0681 |

OTHER PUBLICATIONS

Faller, L.M. et al., "Robust Design of a 3D- and Inkjet-Printed Capacitive Force/Pressure Sensor", IEEE, 17th International Conference on Thermal, Mechanical and Multi-Physics Simulation and Experiments in Microelectronics and Microsystems, 7 pages (Apr. 18, 2016).

* cited by examiner

METHOD FOR PRODUCING A PRESSURE SENSOR MEASURING ELEMENT AND THUS OBTAINED PRESSURE SENSOR MEASURING ELEMENT

CROSS-REFERENCE TO RELATED APPLICATIONS

This application is a National Stage Entry of International Application No. PCT/EP2017/081912 filed on Dec. 7, 2017, which claims priority to German Application No. 10 2016 124 410.4 filed on Dec. 14, 2016.

TECHNICAL FIELD

The invention relates to a method for producing a pressure sensor measuring element, as is known in particular from WO 2010/149501 A1. In addition, the invention relates to a pressure sensor measuring element obtainable with such a method as well as a pressure sensor equipped with it.

RELATED ART

WO 2010/149501 A1 describes a pressure sensor measuring element as well as a pressure sensor equipped with it for pressure detection in a combustion chamber of an internal combustion engine during operation thereof. For this purpose, the pressure sensor measuring element has a separating membrane, a plunger for transmitting deflections of the separating membrane to a force measuring element, and a sleeve accommodating the plunger, the separating membrane and the plunger being designed in one piece as a membrane-plunger unit. A pressure measurement in the combustion chamber of the internal combustion engine is carried out while shielding the force measurement sensor system from the conditions prevailing in the combustion chamber. To manufacture the pressure sensor element, the sleeve and the separating membrane-plunger unit are each manufactured separately from a monolithic stainless steel by turning or other machining processes, then fit into each other and joined by means of welded joints. For this purpose, the rim portions of a first membrane arranged to be facing the combustion chamber and of a second membrane arranged to be facing away from the combustion chamber are welded to the corresponding rims of the sleeve. This creates a pressure measuring element that combines high accuracy with low temperature dependence and a small number of parts. Heat can be easily dissipated through the metal as a material.

SUMMARY

Based on prior art according to WO 2010/149501 A1, it is an object of the present invention to provide a pressure sensor measuring element with improved manufacturability and/or functionality.

In order achieve this object, the invention provides a method according to claim 1. A pressure sensor measuring element that can be produced with this method and a pressure sensor provided with this element are stated in the independent claims.

Advantageous embodiments are the subject of the sub-claims.

According to a first aspect, the invention provides a method for producing a pressure sensor measuring element for a pressure sensor which comprises at least one membrane and a sleeve supporting the membrane, wherein the pressure sensor measuring element is produced in a layer-by-layer generative production method.

It is preferred that the generative production method is a metal powder coating process in which metal powder is applied layer by layer and selectively deformed with a laser or electron beam that is computer controlled selectively over a powder layer to solidify selected areas.

It is preferred that the generative production process is a metal powder layering process in which metal powder is applied in layers and is selectively deformed using a laser or electron beam selectively moved over a powder layer in a computer-controlled manner in order to solidify selected areas.

It is preferred that such a metal powder is used and solidification is carried out in such a way that the pressure sensor measuring element is manufactured from a steel material, a stainless steel material and/or from a NiCrNbMo alloy (in particular from a material with the material number 2.4668, such as Inconel 718).

In a preferred design using the generative production method, a separating membrane, a plunger for transmitting deflections of the separating membrane to a force measuring element and a sleeve receiving the plunger as well as another membrane closing the sleeve on the opposite side to the separating membrane are manufactured in one piece.

It is preferred that with the generative production method at least one channel or a decoupling structure for decoupling the membrane or the sleeve from internal structures of the pressure sensor measuring element and/or a channel passing through the pressure sensor measuring element for at least one connection or signal line and/or a signal or connection line leading through the pressure sensor measuring element and/or at least one stiffening structure for influencing a bending characteristic and/or a resonant frequency and/or at least a part of an electronic component, such as in particular an electrical resistor, and/or a transverse structure and/or at least one heat shield are produced.

It is preferred to attach at least one sensor element to measure a further parameter in the area of the membrane and/or the sleeve and to contact the sensor element by means of the signal or connection line.

It is preferred that the at least one sensor element is selected from a temperature sensor element for measuring a temperature, a temperature difference measuring element for detecting a temperature difference between the membrane and a region of the sleeve turned away from the membrane, a membrane structure monitoring element for monitoring the membrane structure and a resistance element for detecting an electrical resistance of at least one region of the membrane.

In a preferred design, the method is characterized by surface finishing at least on the membrane.

It is preferred that at least one powder outlet opening is made for removing powder material from a cavity of the structure produced by the generative production process and the powder is removed through the at least one powder outlet opening and the at least one powder outlet opening is closed.

In an alternative design it is preferred that the powder material is retained in a cavity of the structure produced by the generative production method.

According to another aspect, the invention provides a pressure sensor measuring element comprising:

at least one membrane and a sleeve for supporting the membrane and at least one sensor element for measuring a further parameter in the region of the membrane.

The pressure sensor measuring element is manufactured or can be manufactured by a method according to one of the designs described above.

It is preferred that the at least one sensor element is selected among a temperature sensor element for measuring a temperature, a temperature difference measuring element for detecting a temperature difference between the membrane and a region of the sleeve facing away from the membrane, a membrane structure monitoring element for monitoring the membrane structure, and a resistance element for detecting an electrical resistance at least of a region of the membrane.

Preferably, the pressure sensor measuring element is designed for a pressure sensor for pressure detection in a combustion chamber of an internal combustion engine during operation thereof, wherein the membrane is a separating membrane, wherein a plunger is provided for transmitting deflections of the separating membrane to a force measuring element, wherein the sleeve receives the plunger and a first end to be turned towards the combustion chamber is closed by the separating membrane and is designed at the opposite second end for holding the force measuring element, wherein the plunger, the membrane and the sleeve are designed in one piece.

Preferably, the pressure sensor measuring element has at least one stiffening structure for stiffening against deformations or for influencing resonance frequencies.

Preferably, the pressure sensor measuring element has at least one rib or a projection or a ring.

Preferably, the pressure sensor measuring element has transverse structures in the form of one or more heat shields.

Preferably, the pressure sensor measuring element has at least one channel for the channel of at least one line or for the decoupling of an inner structure and an outer structure.

Preferably, the pressure sensor measuring element has at least one cavity between an inner and an outer structure.

Preferably, the pressure sensor measuring element has at least one sensor element for monitoring the function or the structure of the membrane.

Preferably, the pressure sensor measuring element is made of steel, stainless steel or a NiCrNbMo alloy (e.g. Inconel 718).

According to another aspect, the invention provides a pressure sensor, comprising a pressure sensor measuring element according to one of the above designs.

Preferably, the pressure sensor is a combination sensor for measuring both pressure and temperature.

According to another aspect, the invention provides a pressure sensor measuring element for a pressure sensor for pressure detection in a combustion chamber of an internal combustion engine during operation thereof, wherein the membrane is a separating membrane, wherein a plunger for transmitting deflections of the separating membrane to a force measuring element is provided, wherein the sleeve receives the plunger and an end to be turned towards the combustion chamber is closed by the separating membrane and an opposite second end is configured for holding the force measuring element, wherein the plunger, the membrane and the sleeve are designed in one piece.

In the following, some of the advantages of particularly preferred embodiments of the invention are explained in more detail.

Especially in the case of pressure sensors used on combustion chambers, but also in the case of other pressure sensors, temperature measurement would often be desirable in addition to pressure measurement.

However, the high pressures and temperatures in a combustion chamber or in other media to be measured lead to an attempt to provide as few connections as possible outside the combustion chamber or the pressure chamber to be measured. A reduction in the number of sealing points is the objective in the design of internal combustion engines or other systems to be monitored.

In the case of pressure sensor measuring elements used up to now, the fabrication of special duct runs, such as in particular a central bore or similar, is difficult. Such a central bore is more difficult to produce using machining process.

With the generative production method to be used according to the invention very different and also complex forms can be produced relatively easily. Thus structures for different additional functions can be easily implemented. In particular, channels or the like can now be easily produced, so that it is now relatively easy to accommodate additional sensor elements in the pressure sensor measuring element for measuring further parameters in the region of the front membrane and to contact them from behind through channels or lines.

BRIEF DESCRIPTION OF DRAWINGS

Embodiments of the invention will now be described in more detail with reference to the attached drawings wherein it is shown by.

DETAILED DESCRIPTION

Figure 1:
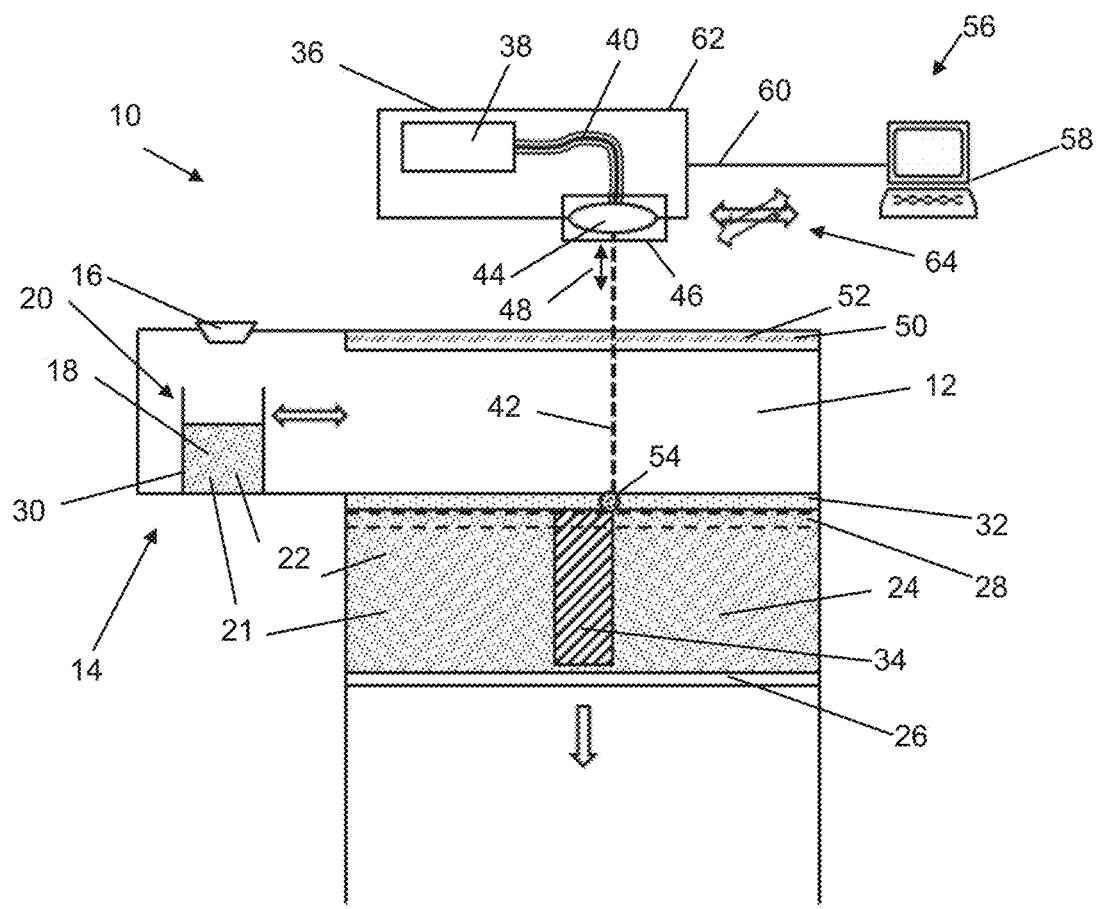
FIG. 1 a schematic diagram of a production device for carrying out an additive production method in the course of the production of a pressure sensor measuring element according to one embodiment.

In the following, reference is first made to FIG. 1 in order to explain a production method for producing a pressure sensor measuring element. A generative production process is used in the production method. In the generative production process described here, a model of a pressure sensor element existing in a control system 56, e.g. as a software file, is generated physically without the necessity of special tools and shaping devices by selective solidification of powder material 21, in particular metal powder 22, which is located in a layer 32 in a powder bed 24.

FIG. 1 shows a production device 10 for carrying out the generative production method for producing the pressure sensor measuring element. The production device 10 comprises a process chamber 12, a material supply device 14 for providing material to be processed in layers, for example from a powder supply 18, a beam generating device 36 for generating a processing beam 42, and the control system 56.

In the process chamber 12 there is the powder bed 24, which has a movable powder bed bottom 26, which after processing a layer 32 is moved downwards by the corresponding processed layer thickness of the respective last pass. At the beginning of the production process, the powder bed bottom 26 is preferably in an upper position 28.

The material supply device 14 has a powder application device 20, which in particular is designed in such a way that after processing of a layer 32 by this, a new layer 32 to be processed from the powder supply 18 is applied to the powder bed 24 again. The powder application device 20 can be, for example, a layer distribution slide 30 or a filling device 16. During the irradiation process by the beam generating device 36, the layer distribution slide 30 is in a waiting position in the region of the material supply device 14, which is not in the processing beam region. The layer distribution slide 30 is only an example for the powder application device 20, further powder application devices can also be used, e.g. powder nozzles for selective powder application, etc. The work piece 34 to be produced is produced in layers in the powder bed 24.

The beam generating device 36 has a beam generating unit 38 as well as at least one beam influencing device 46.

The beam generating unit 38 generates a processing beam 42 sufficient for processing. For example, the processing beam 42 can be a laser or electron beam. If necessary, the beam generating device 36 has a light fiber 40 for guiding a processing beam 42 designed as a laser beam.

The beam influencing device 46 is designed in particular for directing, focusing or otherwise influencing the processing radiation. For this purpose, the beam influencing device 46, for example, has a lens 44, and the beam influencing device 46, for example, performs focusing movements 48. The beam generating device 38 can be moved in one plane by means of a beam generating unit moving device 62 through the control system 56 and beam generating unit displacing movements 64 can be performed.

Process chamber 12 is separated from the environment by a protective device 50. The protective device can, for example, be made of glass or other materials by means of a protective pane 52 that is transparent to laser radiation.

The control system 56, in particular, allows the beam generating device 36 to move in such a way that certain areas of the material layer 32 to be processed are irradiated in order to the subject the material to primary molding (e.g. melting or sintering the powder) at the required areas, e.g. at the radiation impact point 54, and to form the work piece 34. After processing all areas relevant for the layer to be processed, the powder bed bottom 26 is moved downwards and the powder application device 20 applies a new layer of material over the previously processed layer 32 for selective re-irradiation. For example, this can be done by the layer distribution slide 30 moving over the powder bed 24. The control system 56 can be a data processing system 58, for example a CAD system or similar system that is connected to the units to be controlled of the production device 10 via a control line 60.

A steel material, a stainless steel material and/or a NiCrNbMo alloy (e.g. Inconel 718) are particularly suitable as powder material 22, whereby the latter materials have particular advantages with regard to corrosion resistance. Sensors made of such materials are used, for example, in marine diesel engines. For reasons of cost, heavy oils or the like are burned in them. If heavy oils are burned in cold engines, residues arise which are particularly problematic with regard to corrosion of the engine components.

Examples of generative production methods suitable for producing the pressure sensor element may include selective laser sintering, laminated object manufacturing, fused deposition modeling, solid ground curing, and 3D print-like processes.

With the production device 10, a pressure sensor measuring element 66 can be produced in layers as a work piece, which will be explained in more detail below using the remaining Figures.

Figure 2:
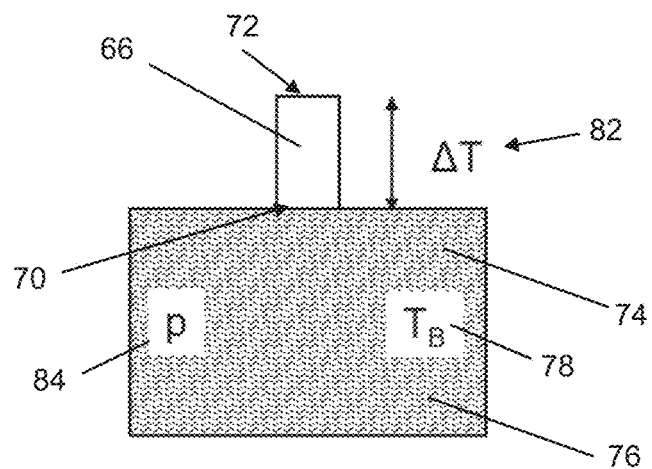
FIG. 2 a schematic sketch of a preferred use of the pressure sensor measuring element herein disclosed.

FIG. 2 shows a preferred application of the pressure sensor element 66.

As shown in FIG. 2, the pressure sensor element 66 has a first end 70 and a second end 72. The pressure sensor element 66 is directly connected to a measuring chamber 74 with the first end 70 ahead. The measuring chamber 74, for example, can be a combustion chamber 76 of an internal combustion engine. For example, the first end 70 can therefore be a side facing the combustion chamber and the second end 72 a side facing away from the combustion chamber.

The pressure sensor measuring element 66 is designed in particular for combustion chamber monitoring of an internal combustion engine, such as a marine engine (driven, for example, by heavy fuel oil or diesel), diesel engines for construction machinery and motor vehicles or a gasoline engine for motor vehicles and the like, as well as in areas of high-temperature applications such as monitoring turbines, for example pressure measurement within a hot steam turbine and injection molding machines.

Such pressure sensor elements 66 are also suitable for measurements on corrosive media such as those found in process technology in the chemical industry.

With the pressure sensor measuring element 66, a pressure 84 can be measured online during operation of a plant or machine to be monitored, in particular a combustion chamber pressure can be measured online during operation of the combustion engine. The pressure signal can be used to control and regulate the operation of an engine, such as an internal combustion engine, and the operation and function of the engine, such as an internal combustion engine in particular, can be monitored. By appropriate positioning of further sensor elements 122 of the pressure measuring element 66, which will be explained in more detail later in the description, it is also possible to output pressure and temperature differences. For example, a temperature difference 82 between the first end 70 and the second end 72 of the pressure measuring element 66 is recorded. A temperature difference measuring element, for example, can also be used for this purpose. This can be used to obtain a sensor that detects a temperature channel and/or a temperature conduction.

Figure 3:
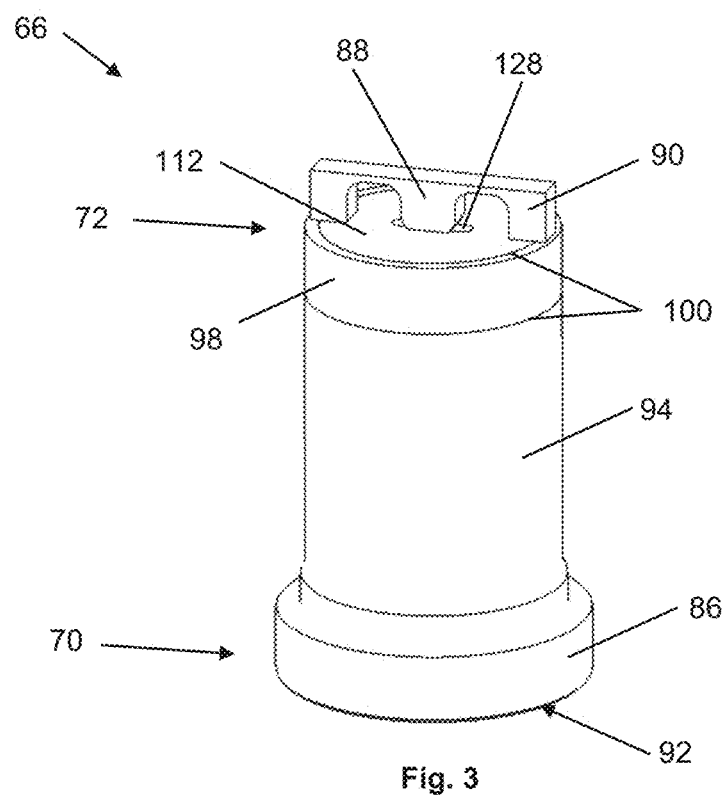
FIG. 3 a perspective view of a pressure sensor measuring element according to a first embodiment.
Figure 4:
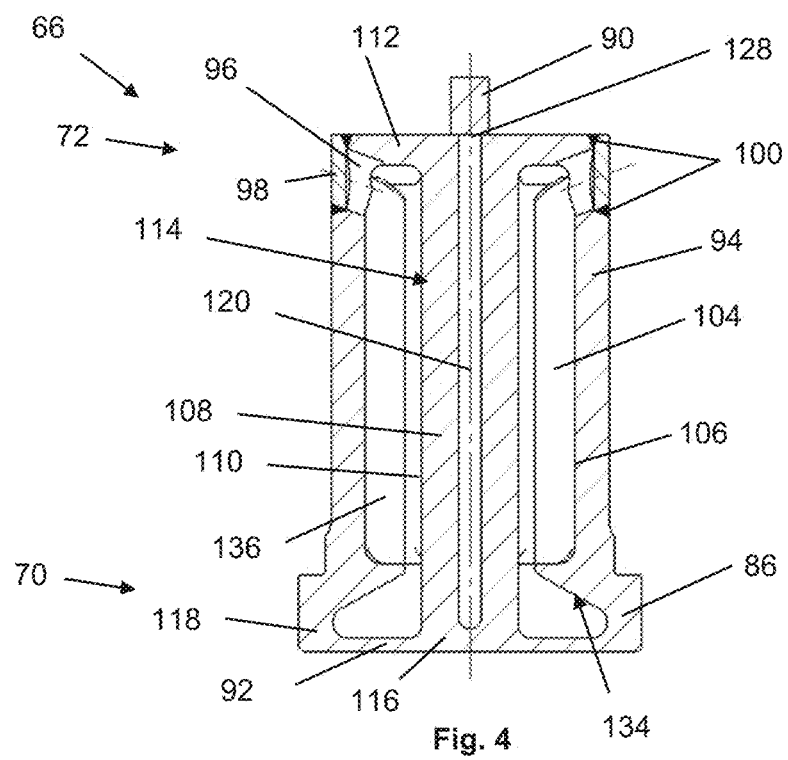
FIG. 4 a sectional view of a pressure sensor measuring element according to the first embodiment.
Figure 5:
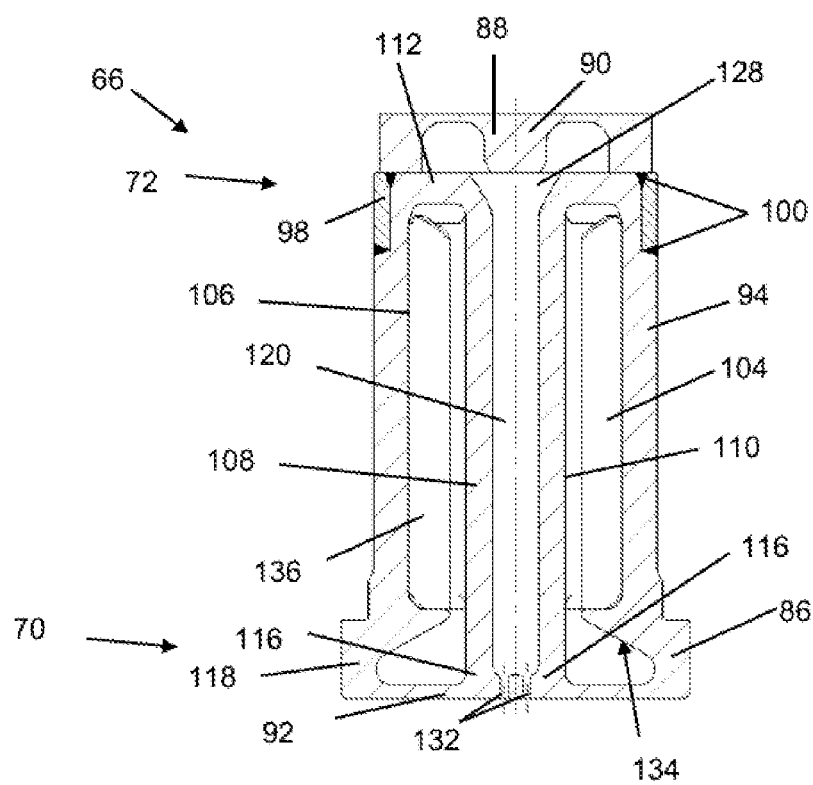
FIG. 5 another sectional view of the pressure sensor measuring element according to the first embodiment.

Referring to FIGS. 3 to 5, an embodiment of the pressure sensor measuring element 66 is described, which can be produced with the production device 10 previously described with reference to FIG. 1.

As can be seen from FIGS. 3 to 5, the pressure sensor element 66 has a pressure measuring cell 68 and a force measuring element 88. The pressure measuring cell 68 is manufactured in one piece using the generative production process.

The pressure measuring cell 68 consists of a membrane-plunger unit 114 and a sleeve 94. The membrane-plunger unit 114 has a first membrane or measuring membrane facing the measuring chamber 74 in the form of a separating membrane 92 which is connected by means of a plunger 108 to a second membrane 112 facing away from the measuring chamber 74 in such a way that movements of the separating membrane 92 are transmitted to the second membrane. The membrane 92, 112 and the plunger 108 form the membrane-plunger unit 114, which is housed inside the sleeve 94. In one design, the sleeve 94 is not post-processed.

The force measuring element 88 is designed in particular as a bending beam 90 with strain gauges.

As shown in FIG. 3, the sleeve 94 is essentially cylindrical. At the first end 70, the sleeve 94 has a radially extending flange 86 on its outer circumference, which is flush with the separating membrane 92. The separating membrane 92 can be influenced in its membrane properties by structuring or by changes to the geometry. In one design, the flange 86 is not post-processed.

The pressure measuring cell 68 is described in more detail below with reference to FIGS. 4 and 5. The pressure measuring cell 68 has only one component or part, namely the one-piece unit consisting of the sleeve 94, the separating membrane 92, the plunger 108 and the membrane 112 at the second end 72. The sleeve 94 and the plunger 108 have a smooth surface in the inner area between an outer wall 110 of the plunger 108 and an inner wall 106 of the sleeve 94. The pressure measuring cell 68 is produced using the generative production method. At the second end 72 of the pressure measuring cell 68, the bending beam 90 is attached to the second membrane 112.

In the manufacture of the pressure measuring cell 68, unprocessed, loose powder material 22 remains in the cavity 104 between plunger 108 and inner wall 106 of the sleeve as a result of the generative production method, wherein the at least one powder outlet opening 96 is closed as a result of producing tightness of the pressure measuring cell 68 after the loose material powder 22 has been removed, for example by a closure ring 98. The at least one powder outlet opening 96 should have a sufficient diameter so that the material powder can be completely removed. The closure ring 98 is applied to close the powder outlet opening 96 and, as shown in FIG. 4, is welded at two annular welds 100 to the sleeve 94 and the membrane 112 at the second end 72 of the pressure measuring cell 68. The welding process can, for example, be a laser welding process. For this purpose, the pressure measuring cell 68 has an axially extending shoulder 102 with a smaller diameter than the sleeve in the area of the second end 72. The closing ring 98 is pushed onto this closing ring shoulder 102.

In the area of the first end 70, the separating membrane 92 merges into the wall of the sleeve 94 in the outer radial circumference in the ring membrane area 118. The same applies to membrane 112 at the second end 72.

A channel 120 is provided inside plunger 108, which extends from the first end to the second end of pressure measuring cell 68 and into which at least one further sensor element 122 can be inserted. Sensor element 122 can, for example, be a resistance sensor or a temperature sensor.

Structural elements 136 are partially represented by the sectional view. The structural elements 136 are arranged radially along the entire circumference of the inner wall of the sleeve 106 and run axially. Size, number and design of the structural elements 136 are exemplarily shown in all Figures and can vary depending on the necessity of influencing the respective parameter. The structural elements 136 serve to influence various parameters such as stiffness, temperature conduction and resonance frequency and can be attached to the respective component in the form of ribs 138.

FIG. 5 shows a different section plane from FIG. 4, from which it can be seen that the channel 120 extends to the first end 70 of the pressure measuring line 68 and at least one opening 132 is suitable for passing through a further sensor, i.e. in particular the temperature sensor. In one design, opening 132 is reworked, e.g. re-drilled to a diameter of 0.2 mm.

Figure 6:
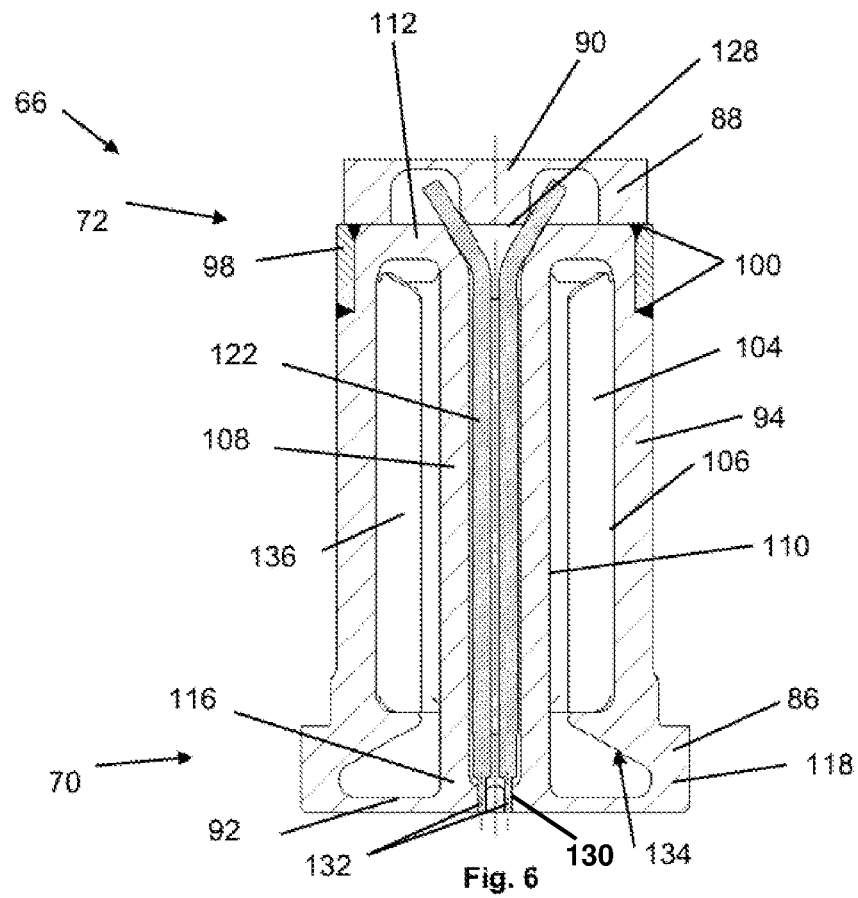
FIG. 6 another sectional view of the pressure sensor measuring element with a sensor element inserted therein according to the first embodiment.

FIG. 6 shows the same cutting plane as FIG. 5. In contrast to FIG. 5, the additional sensor element 122 in FIG. 6 is now inserted into channel 120 of plunger 108 of the pressure measuring cell 68.

The at least one opening 132 can be seen in a separating membrane-plunger transition area 116, into which at least one sensor tip 130 of the additional sensor element 122 is positioned. The sensor tip 130 is flush with the separating membrane 92.

Tightness can be achieved by connecting the sensor tip 130 and the separating diaphragm 92, for example by welding.

The sensor tip 130 is thus positioned close to the measuring chamber 74, which can represent, for example, the combustion chamber temperature $T_B$ 78 of the combustion chamber 76.

On the other hand, the sensor element 122 can also be used to check the surface structure of the separating membrane 92. Elements can also be attached to the membrane to monitor the membrane structure or function of the separating membrane 92. One example is the attachment of a resistor to the inside of the separating membrane 92. This allows cracks in the separating membrane 92 to be monitored. If a crack occurs in the separating membrane 92, the electrical resistance changes.

Such a resistor could be manufactured in such a way that at the time when the corresponding layer has to be built, a different powder material is applied to provide the material for the resistor.

Figure 7:
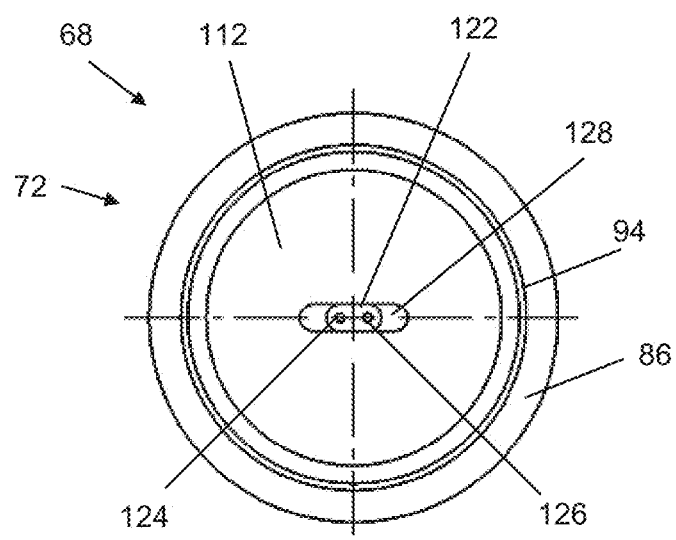
FIG. 7 a top view of the pressure sensor measuring element shown in FIG. 5.

FIG. 7 shows a top view of the pressure measuring cell 68. In the center, the openings for inserting 132 the additional sensor element 122 and an associated signal line 124 or connection line 126 are visible. The lines 124, 126 can be led at the second end 72 through line through openings 128 out of the pressure measuring cell 68 to processing electronics (not shown).

Figure 8:
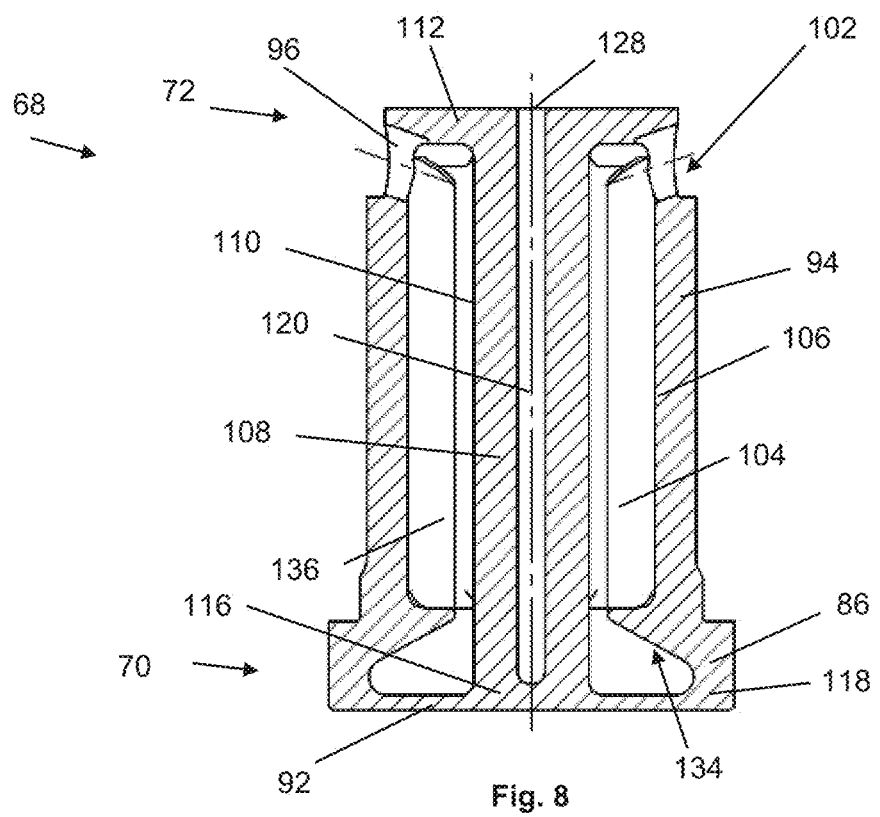
FIG. 8 another sectional view of the pressure sensor measuring element with powder outlet openings not closed, according to the first embodiment.
Figure 9:
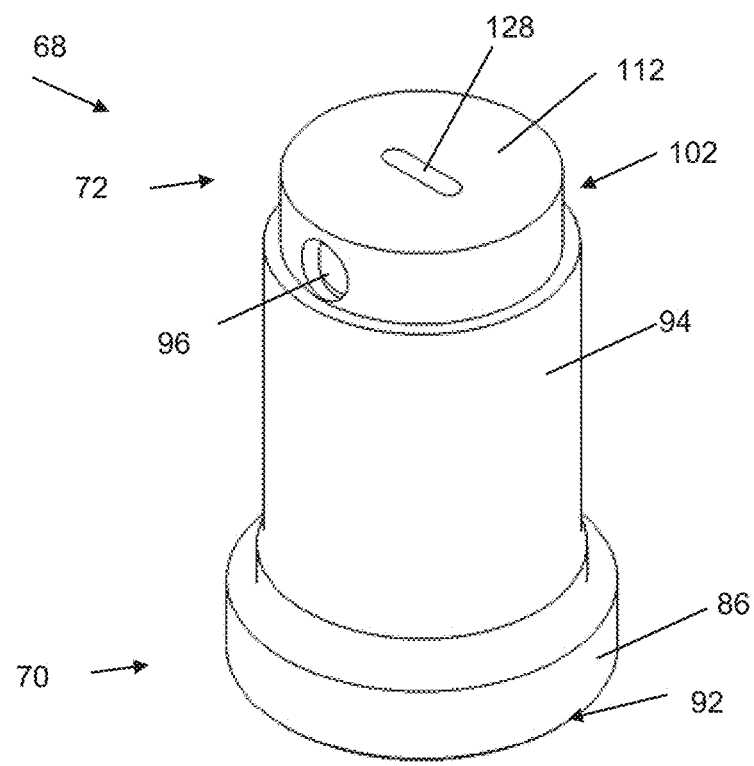
FIG. 9 a perspective view of the pressure sensor measuring element according to the first embodiment.

FIGS. 8 and 9 show the production state of the pressure measuring cell 68 after production, after the powder material 22 has been removed through the at least one powder outlet opening 96. The powder outlet opening 96 is arranged in the area of the second end 72.

Figure 10:
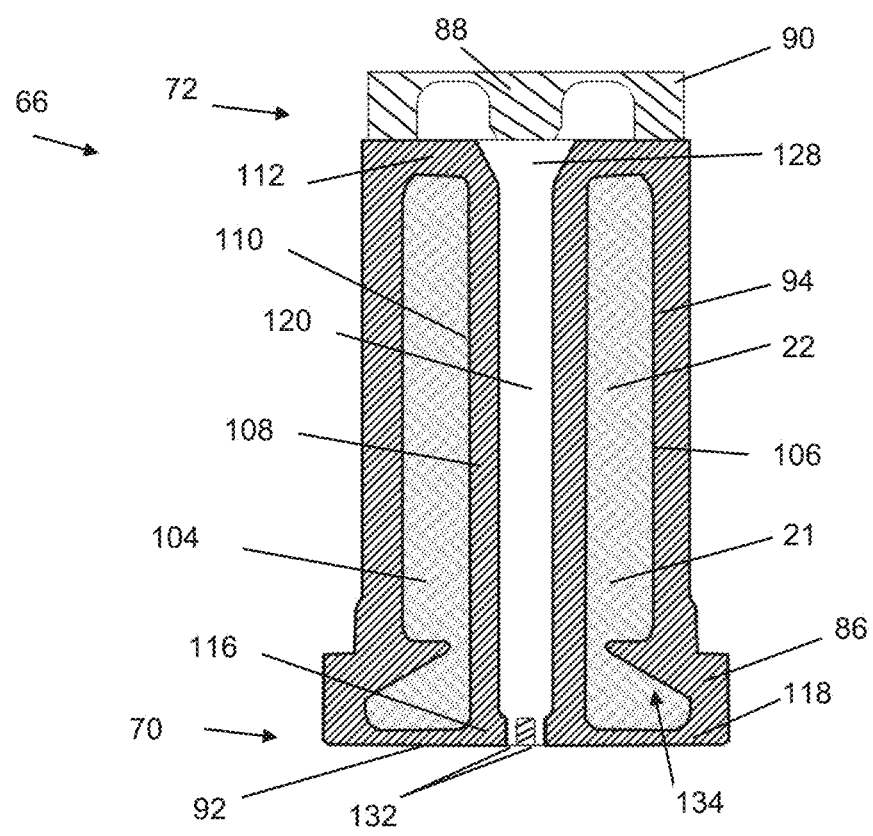
FIG. 10 a sectional view of the pressure sensor measuring element according to a second embodiment.

A second embodiment is shown in FIG. 10. In contrast to the first embodiment described so far, this embodiment has no powder outlet openings 96 and the material powder 22 remains in the pressure measuring cell 68. This can influence in particular the temperature channel.

Figure 11:
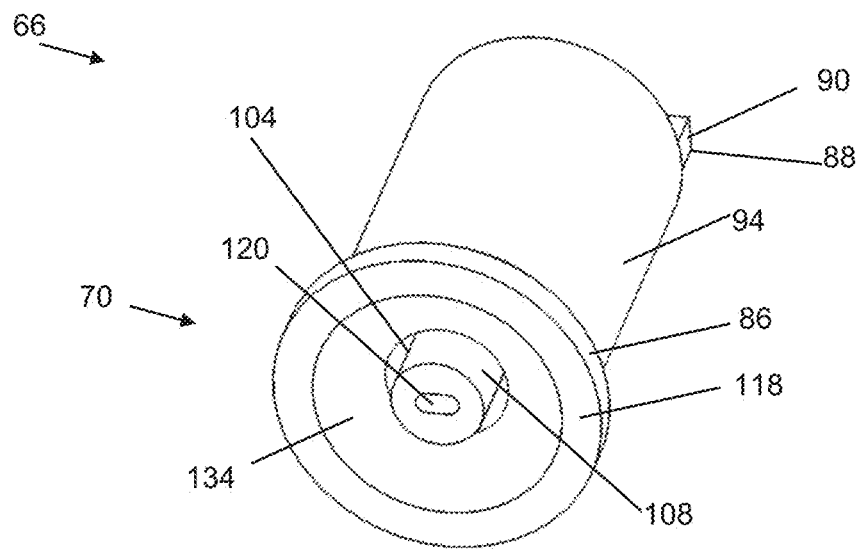
FIG. 11 a perspective sectional view of the pressure sensor measuring element according to the second embodiment.

FIG. 11 shows a section in the area of the flange 86. The pressure measuring cell 68 can have further transverse structures. To reduce the effect of heat from the side facing the combustion chamber to the side facing away from the combustion chamber, the flange 86 has a heat shield 134 inside the pressure measuring cell. These structures reduce heat conduction from the side facing the combustion chamber to the side facing away from the combustion chamber. For this purpose, an FEM calculation can be made for the heat transfer calculation, for example. The introduction of such structures is possible in a generative production process. The channel 120 is arranged in the center of the pressure measuring cell 68.

Figure 12:
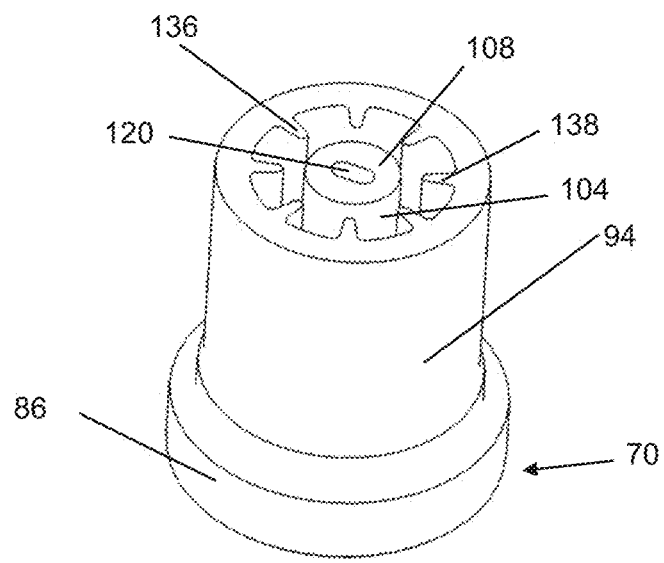
FIG. 12 a perspective sectional view of a pressure sensor measuring element with structural elements on the inner wall of the sleeve.
Figure 13:
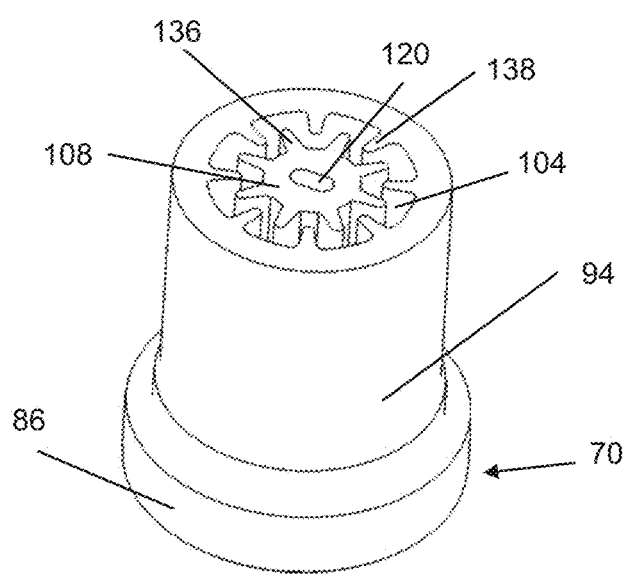
FIG. 13 another perspective sectional view of a pressure sensor measuring element with structural elements on the inner wall of the sleeve and on the outer wall of the plunger.

Further designs and structural elements 136 of sleeve 94 and plunger 108 can be seen in FIGS. 12 and 13. For better representation, the pressure measuring cell 68 is cut in the area between the first end and the second end 72, whereby the structural elements 136 in FIGS. 12 and 13 are exemplarily shown as stiffening ribs 138. Further possibilities are, for example, the provision of channels in the wall or the production of further axial decoupling geometries. Thus, the outer shell, which is subjected to mechanical stress, can be mechanically decoupled from the inner structure. Such stiffening ribs 136 can be used to influence resonance frequencies in particular. In this way, a resonant frequency in the range of 20 kilohertz or higher, which in the first drawing would be approx. 7 kilohertz without stiffening ribs, can be achieved. Analogous to the descriptions in FIG. 12, the plunger in FIG. 13 has further ribs 138.

The interior of the pressure measuring cell 68 should be sealed to prevent the penetration of the combustion gas into the pressure measuring cell if the separating membrane 92 fails. Therefore, in a preferred design, the at least one powder outlet opening 96 is closed with a powder outlet opening closure ring 98. The powder outlet opening closure ring 98 is seal-welded, for example using a laser welding process.

The stainless steel grades with the material numbers 1.4542 and 1.4548 are particularly suitable for use with a pressure sensor measuring element when stainless steel is used.

An important aspect of the invention concerns the combination of at least two sensors. This creates a combination sensor that measures pressure and temperature.

Therefore pressure and temperature can be measured at the separating membrane 92. It is also possible to output pressure and temperature difference. A temperature difference between the membrane side and the rear side is measured for this purpose. This can result in a sensor that detects a temperature channel or a temperature conduction.

The generative production method offers particular advantages, which are explained below.

The material selection (in particular Inconel 718—this material has particular advantages with regard to corrosion resistance) should be mentioned here. The background to this is that such sensors are used, for example, in marine diesel engines, in which heavy oils or the like are burned for cost reasons. If heavy oils are burned in cold engines, residues arise which are particularly problematic with regard to corrosion of the engine components.

Another advantage of the invention refers to the shape of a pressure sensor. A particular difficulty of this type of pressure sensor is the production of special channel shapes, such as a central bore in particular. Such a central bore is more difficult to produce using machining techniques. The generative production process is predestined for this.

A further possibility is to manufacture channels for cables, such as in particular a thermocouple or the like.

Another possibility is, for example, to produce channels or axial decoupling geometries in the wall. In this way, the outer shell, which is subjected to more mechanical stress, can be mechanically decoupled from the inner structure.

Further structures can be attached. One example is stiffening ribs. These are shown as examples in the Figures already explained. Such stiffening ribs can be used to influence resonance frequencies in particular. Thus a resonance frequency, which in the first drawing would be about 7 kilohertz without stiffening ribs, can be in the range of 20 kilohertz or higher.

Furthermore, elements can be attached to the separating membrane 92 to monitor the membrane structure or the function of the separating membrane 92. An example is the attachment of a resistor to the inside of the separating membrane 92. This allows cracks in the separating membrane 92 to be monitored. If a crack occurs in the separating membrane 92, the electrical resistance changes.

The production process is then such that when the corresponding layer is to built, a different powder material is be applied to provide the material for the resistor.

Another example would be the arrangement of transverse structures, such as the heat shield 134. An FEM calculation for the heat transfer can be made here. For example, the membrane is located in a combustion chamber of an engine, where the temperature has to be kept away from the electronics. It is possible with generative production technology to introduce corresponding structures that provide for less thermal conduction from the hot side to the cold side.

In the second embodiment with powder discharge openings, it has been found that the powder discharge openings should have a sufficiently large diameter so that the powder can be completely discharged. These openings can then be closed by a closure element—for example the powder outlet opening closure ring 98.

Another alternative design involves the powder material 21 remaining in the sensor.

Possible applications are mainly planned for high-temperature applications such as combustion chamber monitoring, but also for injection molding machines and the monitoring of turbines such as a hot steam turbine, where the pressure is measured inside the turbine, for example. It is also possible to measure corrosive media, such as those found in process technology in the chemical industry.

In the following, surface finishing will be discussed in more detail. The surfaces in generative production processes are quite rough. Where a high surface quality or a high flatness is desired, post-processing steps are planned. This is currently being considered for the separating membrane 92 and for those areas where force elements have to be welded on.

Other post-processing steps can also be carried out on the separating membrane 92. The membrane thickness of the separating membrane 92 should be maintained.

For example, if post-processing is planned on the separating membrane 92, structuring of the separating membrane 92 can also be carried out. One example is that a slight angle can be provided in the membrane in a manner set back to the force element from the outside towards the center in order to improve the membrane properties.

For further details on the design, beneficial use and operation of the pressure sensor measuring element and a pressure sensor fitted with it, reference is expressly made to WO 2010/149501 A1, which is incorporated herein by reference. Further details of advantageous designs of the invention can be obtained by combining the measures, steps, features and technologies described here with the disclosure of WO 2010/149501 A1.

In order to be able to produce pressure sensor measuring elements cost-effectively, the invention provides, according to one aspect, a process for the production of a pressure sensor measuring element for a pressure sensor, which comprises at least one membrane and a sleeve supporting the membrane, the pressure sensor measuring element being produced in a layer-wise generative production process. Thus a combination sensor for measuring pressure and a further parameter can have a simple structure. In addition, structures for stiffening or resonant frequency influencing or for heat conduction influencing can be introduced.

LIST OF REFERENCE NUMBERS 10 production device
12 process chamber
14 material supply device
16 filling device
18 powder supply
20 powder application device
21 powder material
22 metal powder
24 powder bed
26 powder bed bottom
28 upper position of powder bed
30 layer distribution slide
32 layer
34 work piece
36 beam generating device
38 beam generating unit
40 light fiber
42 processing beam
44 lens
46 beam influencing device
48 focusing movement
50 protective device
52 protective shield
54 radiation impingement point
56 control system
58 data processing system
60 control line
62 beam generating unit moving device
64 beam generating unit displacing movement
66 pressure sensor measuring element
68 pressure measuring cell
70 first end
72 second end
74 measuring chamber
76 combustion chamber
78 combustion chamber temperature $T_B$
82 temperature difference $\Delta T$
84 pressure
86 flange
88 force measuring element
90 bending bar
92 separating membrane (facing the combustion space)
94 sleeve
96 powder outlet opening
98 powder outlet opening closing ring
100 closing ring welding seam
102 closing ring shoulder
104 cavity
106 innerf wall of the sleeve
108 plunger
110 outer wall of the plunger
112 membrane (facing away from the combustion chamber)
114 membrane-plunger-unit
116 separating membrane-plunger transition zone
118 annular membrane region
120 channel
122 sensor element
124 signal line
126 connection line
128 line through opening
130 sensor tip
132 opening for sensor
134 heat shield
136 structural element
138 rib

The invention claimed is:

1. A method for producing a pressure sensor measuring element being a main body of a pressure sensor, the pressure sensor measuring element comprising:
   at least one membrane; and
   a sleeve supporting said membrane,
   wherein said pressure sensor measuring element is produced in a layer-by-layer generative production method, the generative production method comprising:
   attaching at least one sensor element for measuring an additional parameter in a region of the membrane and/or the sleeve, and a region contacting the sensor element, by means of a signal line or a connection line.

2. The method according to claim 1,
   characterized in that the generative production method is a metal powder layering process in which metal powder is applied layer by layer and is selectively deformed using a laser or electron beam that is selectively moved over a powder layer in a computer-controlled manner in order to solidify selected areas.

3. The method according to claim 2,
   characterized in that the metal powder is used and the solidification is effected in such a way that the pressure sensor measuring element is manufactured from a steel material, a stainless steel material and/or from a NiCrNbMo alloy.

4. The method according to claim 2,
   characterized by the steps 9.1.1 and 9.1.2:
   9.1.1 forming at least one powder outlet opening for discharging powder material from a cavity within the sleeve produced using the generative production method and
   9.1.2 discharging the powder through said at least one powder outlet opening, or by the steps 9.1.1 and 9.1.2 as well as step 9.1.3:
   9.1.3 closing the at least one powder outlet opening,
   or by the step
   9.2 keeping the powder material in a cavity of within the sleeve produced using the generative production method.

5. The method according to claim 1,
   wherein said membrane is a separating membrane, and characterized in that the separating membrane, a plunger for transmitting deflections of the separating membrane to a force measuring element receiving said plunger, and a further membrane closing said sleeve on the opposite side to the separating membrane are manufactured in one piece using the generative production method.

6. The pressure sensor measuring element according to claim 5, for a pressure sensor for pressure detection in a combustion chamber of an internal combustion engine during operation thereof, wherein the sleeve receives the plunger and is closed on a first end facing the combustion chamber by the separating membrane and is designed on the opposite second end for holding the force measuring element, wherein the plunger, the membrane and the sleeve are manufactured in one piece.

7. The method according to claim 1,
characterized in that said generative production method is used to produce:
at least one channel or a decoupling structure for decoupling the membrane or the sleeve from inner structures of the pressure sensor measuring element; and/or
a channel leading through the pressure sensor measuring element for at least one connection line or a signal line and/or
a signal line or a connection line leading through the pressure sensor measuring element and/or
at least one stiffening structure for influencing a bending characteristic and/or a resonant frequency, and/or
at least a part of an electronic component, such as in particular an electrical resistor,
at least one transverse structure,
at least one heat shield.

8. The method according to claim 1,
characterized in that the at least one sensor element is selected among a temperature sensor element for measuring a temperature, a temperature difference measuring element for detecting a temperature difference between the membrane and a region of the sleeve facing away from said membrane, a membrane structure monitoring element for monitoring the membrane structure, and a resistance element for detecting an electrical resistance of at least a region of the membrane.

9. The method according to claim 1,
characterized by a surface post-processing operation at least on the membrane.

10. The pressure sensor measuring element according to claim 1, characterized by at least one or more or all of the following structures:

at least one stiffening structure for stiffening against deformations or for influencing resonant frequencies,
at least one rib or projection or ring and/or
transverse structures in a form of heat shields and/or
at least one channel for leading through at least one line or for decoupling an inner structure and an outer structure,
at least one cavity between an inner and an outer structure and/or
at least one sensor element for monitoring a function or the structure of the membrane.

11. The pressure sensor measuring element according to claim 1, made of steel, stainless steel or NiCrNbMo alloy.

12. A pressure sensor measuring element, comprising:
at least one membrane;
a sleeve for supporting said membrane; and
at least one sensor element for measuring an additional parameter in a region of the membrane,
wherein said pressure sensor measuring element is produced in a layer-by-layer generative production method.

13. The pressure sensor measuring element according to claim 12,
characterized in that the at least one sensor element is selected among a temperature sensor element for measuring a temperature, a temperature difference measuring element for detecting a temperature difference between the membrane and a region of the sleeve facing away from the membrane, a membrane structure monitoring element for monitoring the membrane structure, and a resistance element for detecting an electrical resistance of at least a region of the membrane.

14. A pressure sensor, in particular combination sensor, for detecting both pressure and temperature, comprising the pressure sensor measuring element according to claim 12.

* * * * *